United States Patent
Ross et al.

(10) Patent No.: US 11,418,603 B2
(45) Date of Patent: Aug. 16, 2022

(54) DYNAMIC BACKOFF AND RETRY ATTEMPTS BASED ON INCOMING REQUEST

(71) Applicant: INTERNATIONAL BUSINESS MACHINES CORPORATION, Armonk, NY (US)

(72) Inventors: Martin A. Ross, Gosport (GB); Andrew S. M. Edwards, Southampton (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 180 days.

(21) Appl. No.: 16/053,173

(22) Filed: Aug. 2, 2018

(65) Prior Publication Data

US 2020/0045117 A1    Feb. 6, 2020

(51) Int. Cl.

| | |
|---|---|
| *G06F 15/173* | (2006.01) |
| *H04L 67/51* | (2022.01) |
| *H04L 67/60* | (2022.01) |
| *H04L 67/10* | (2022.01) |
| *H04L 67/02* | (2022.01) |
| *H04L 67/143* | (2022.01) |
| *H04L 67/141* | (2022.01) |

(52) U.S. Cl.
CPC .............. *H04L 67/16* (2013.01); *H04L 67/02* (2013.01); *H04L 67/10* (2013.01); *H04L 67/141* (2013.01); *H04L 67/143* (2013.01); *H04L 67/32* (2013.01)

(58) Field of Classification Search
CPC ......... H04L 67/16; H04L 67/02; H04L 67/10; H04L 67/32
See application file for complete search history.

(56) References Cited

U.S. PATENT DOCUMENTS

| | | | |
|---|---|---|---|
| 9,706,581 B2 | 7/2017 | Deu-Ngoc et al. | |
| 10,349,234 B1 * | 7/2019 | Rivkin | .............. H04M 3/42059 |
| 10,511,690 B1 * | 12/2019 | Chatterjee | ................ H04L 67/02 |
| 10,635,789 B1 * | 4/2020 | Golden | ................... G06F 21/30 |

(Continued)

OTHER PUBLICATIONS

V. Heorhiadi, S. Rajagopalan, H. Jamjoom, M. K. Reiter and V. Sekar, "Gremlin: Systematic Resilience Testing of Microservices," 2016 IEEE 36th International Conference on Distributed Computing Systems (ICDCS), Nara, 2016, pp. 57-66. (Year: 2016).*

(Continued)

*Primary Examiner* — Richard G Keehn
(74) *Attorney, Agent, or Firm* — Robert Shatto; Andrew D. Wright; Roberts Calderon Safran & Cole, P.C.

(57) ABSTRACT

A computer-implemented method includes: receiving, by a computer device, a request from an upstream service in a microservices architecture, wherein the computer device runs a downstream service in the microservices architecture and wherein the request includes metadata; modifying, by the computer device, retry logic of the downstream service; sending, by the computer device, a request to an additional downstream service; performing, by the computer device, retry attempts of the request to the additional downstream service in accordance with the modified retry logic; and sending, by the computer device, a response to the upstream service within a response time defined by the metadata.

18 Claims, 5 Drawing Sheets

(56) References Cited

U.S. PATENT DOCUMENTS

| | | | | |
|---|---|---|---|---|
| 2010/0299437 A1* | 11/2010 | Moore | ................ | H04L 67/1008 |
| | | | | 709/226 |
| 2015/0134846 A1* | 5/2015 | Bazar | .................... | H04L 65/608 |
| | | | | 709/231 |
| 2016/0316028 A1* | 10/2016 | Sengupta | ............ | H04L 43/0847 |
| 2016/0330279 A1* | 11/2016 | Patel | .................... | G06F 16/2358 |
| 2017/0041406 A1 | 2/2017 | Lawson et al. | | |
| 2017/0242784 A1 | 8/2017 | Heorhiadi et al. | | |
| 2018/0048733 A1* | 2/2018 | Pitts | ..................... | G06F 12/0891 |
| 2019/0065241 A1* | 2/2019 | Wong | .................... | G06F 9/5038 |
| 2019/0098106 A1* | 3/2019 | Mungel | ............... | H04L 67/2838 |
| 2019/0373046 A1* | 12/2019 | Gupta | ...................... | H04L 67/10 |
| 2020/0045131 A1* | 2/2020 | Nigam | ................... | H04L 41/12 |
| 2020/0084293 A1* | 3/2020 | Chatterjee | ............. | H04L 67/322 |

OTHER PUBLICATIONS

Anonymous, Secure layers for container technologies, IP.Com, IPCOM000253480D, Apr. 3, 2018, 3 pages.

Anonymous, Providing guidance to operations team based on event meta-data, IP.Com, IPCOM000250578D, Apr. 4, 2017, 4 pages.

Tost, "Planning and handling timeouts in service-oriented environments", https://www.ibm.com/developerworks/websphere/techjournal/0909_tost/0909_tost.html, IBM, Sep. 30, 2009, 10 pages.

Fowler, "CircuitBreaker", https://martinfowler.com/bliki/CircuitBreaker.html, MartinFowler.COM, Mar. 6, 2014, 9 pages.

Dvorkin, "Seven micro-services architecture advantages", http://eugenedvorkin.com/seven-micro-services-architecture-advantages/, Jun. 3, 2014, 4 pages.

Preuveneers et al., "Access Control with Delegated Authorization Policy Evaluation for Data-Driven Microservice Workflows", Sep. 30, 2017, 21 pages.

Singh, "Understanding Retry Pattern with Exponential back-off and Circuit Breaker Pattern", Oct. 7, 2016, 7 pages.

Microservices, https://en.wikipedia.org/wiki/Microservices, Wikipedia, Jul. 30, 2018, 8 pages.

Mell et al., "The NIST Definition of Cloud Computing", NIST, Special Publication 800-145, Sep. 2011, 7 pages.

Unknown, "HTTP routing", https://www.envoyproxy.io/docs/envoy/latest/intro/arch_overview/http/http_routing, accessed on Mar. 3, 2021, 4 pages.

Unknown, "Router", https://www.envoyproxy.io/docs/envoy/latest/configuration/http/http_filters/router_filter, accessed on Mar. 3, 2021, 9 pages.

Unknown, "RouterCC", https://github.com/envoyproxy/envoy/blob/master/source/common/router/router.cc, accessed on Mar. 3, 2021, 52 pages.

Unknown, "Getting started with Envoy Proxy for microservices resilience", https://www.datawire.io/guide/traffic/getting-started-lyft-envoy-microservices-resilience/, accessed on Mar. 3, 2021, 8 pages.

* cited by examiner

DYNAMIC BACKOFF AND RETRY ATTEMPTS BASED ON INCOMING REQUEST

BACKGROUND

The present invention relates generally to microservices architecture in distributed computing systems and, more particularly, to dynamically controlling retry and backoff attempts in microservices architecture in distributed computing systems.

Microservice is a software development technique, a variant of the service-oriented architecture (SOA) architectural style, that structures an application as a collection of loosely coupled services. In a microservices architecture, services are fine-grained and the protocols are lightweight. One of the driving forces for building a microservices architecture is often for isolation of components, i.e., loosely coupled services each with a discrete responsibility that work together and enable technology diversity and for code changes to reach production faster without having to redeploy a whole system. A common design pattern for intercommunication between microservices is a circuit breaker, where a request is retried several times potentially with incremental backouts before the circuit breaker cuts off the request for a period of time in an attempt to save system resources.

SUMMARY

In a first aspect of the invention, there is a computer-implemented method including: receiving, by a computer device, a request from an upstream service in a microservices architecture, wherein the computer device runs a downstream service in the microservices architecture and wherein the request includes metadata; modifying, by the computer device, retry logic of the downstream service; sending, by the computer device, a request to an additional downstream service; performing, by the computer device, retry attempts of the request to the additional downstream service in accordance with the modified retry logic; and sending, by the computer device, a response to the upstream service within a response time defined by the metadata.

In another aspect of the invention, there is a computer program product including a computer readable storage medium having program instructions embodied therewith. The program instructions are executable by a computer device to cause the computer device to receive a request from an upstream service in a microservices architecture, wherein the computer device runs a downstream service in the microservices architecture and wherein the request includes metadata; modify retry logic defined by a circuit breaker of the downstream service; send a request to an additional downstream service; perform retry attempts of the request to the additional downstream service in accordance with the modified retry logic; and send a response to the upstream service within a response time defined by the metadata.

In another aspect of the invention, there is a system comprising: a computer device running a downstream service in a microservices architecture, the computer device comprising a processor, a computer readable memory, and a computer readable storage medium; program instructions to receive a request from an upstream service in a microservices architecture, wherein the request includes metadata; program instructions to modify retry logic defined by a circuit breaker of the downstream service; program instructions to send a request to an additional downstream service; program instructions to perform retry attempts of the request to the additional downstream service in accordance with the modified retry logic; and program instructions to send a response to the upstream service within a response time defined by the metadata, wherein the response sent to the upstream service is one of a valid response and an error message. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to microservices architecture in distributed computing systems and, more particularly, to dynamically controlling retry and backoff attempts in microservices architecture in distributed computing systems. According to aspects of the invention, an upstream service (e.g., a calling service) includes metadata in a microservice call to a downstream service (e.g., a called service), and the downstream service adjusts its retry and backoff attempts based on the metadata. In embodiments, the metadata defines a required or anticipated response time specified by the upstream service. In embodiments, the downstream service adjusts its retry and backoff attempts by adjusting a number of retry attempts and/or a timing of retry attempts (i.e., initially defined by a circuit breaker) to fit within the response time indicated in the metadata. In this manner, implementations of the invention advantageously improve circuit breaker operation to avoid a failure where the upstream service times out while the downstream service is still attempting to respond to the microservice call.

Microservices architecture is a methodology that breaks up an application into plural different services (e.g., microservices) that each perform a very specific process of the application. The microservices are independent from one another such that one of the microservices can be changed without changing the others and without having to change the entire application. Prior to microservices, even the smallest change to a monolithic application required changing the entire application.

Microservices operate by making calls to one another and receiving responses to those calls. Each microservice may be an application (program module) running on a server (e.g., an HTTP server). Since microservices operate by making calls, many systems implement circuit breakers to handle the situation where one microservice is not responding in time to a call from another microservice. The circuit breaker is logic (e.g., a program module) that typically defines a number of retry attempts and a time for each retry attempt or a total time out. Each microservice typically has its own circuit breaker, and each circuit breaker typically has its own rules for number of retry attempts, time for each retry attempt, and total time out.

In conventional microservices architectures, the circuit breaker of one microservice does not coordinate with the circuit breaker of another microservice. As a result, the circuit breaker of an upstream service (e.g., a calling service) does not know how the circuit breaker of a downstream service (e.g., a called service) operates. This can lead to the circuit breaker of the upstream service timing out while the circuit breaker of the downstream service is still permitting retry attempts with another downstream service. This leads to wasted computing resources since the downstream service continues retrying even though the upstream service has already timed out.

In accordance with aspects of the invention, and in contrast to conventional systems, the downstream service adjusts its circuit breaker characteristics based on metadata received from the upstream service. In embodiments, the downstream service adjusts the retry logic defined by its circuit breaker to perform all of its retry attempts within a response time specified in the metadata. In this manner, implementations of the invention avoid the situation where the circuit breaker of the upstream service times out while the circuit breaker of the downstream service is still permitting retry attempts with another downstream service.

In one embodiment, the downstream service adjusts its circuit breaker characteristics based only on the metadata received from the upstream service. In another embodiment, the downstream service adjusts its circuit breaker characteristics based on a combination of: (i) metadata received from the upstream service and (ii) historical data about the downstream service and another downstream service. In this manner, implementations of the invention provide a system for managing retry logic for distributed computing systems comprised of a client component that manages retry logic to a downstream system, wherein the client component receives an event from an upstream system with metadata stating a required response time. In embodiments, the client components utilizes the required response time and historical data (e.g., on processing times, retry attempts, and likelihood of failure) to modify the retry logic to increase or decrease the number of attempts and/or modify the retry logic to increase or decrease an exponential backoff, or to utilize an alternative retry strategy.

Implementations of the invention improve the performance of a distributed computing system by reducing the amount of computing resources used in microservice calls. For example, implementations of the invention avoid wasted computing resources by eliminating the situation where an upstream service times out while a downstream service continues retrying a microservice call with another downstream microservice, and this improves the performance of the entire distributed computing system. Implementations of the invention may also be implemented using particular machines. For example, an embodiment includes a microservices architecture comprising microservices applications that run on HTTP servers and that communicate with one another using RESTful APIs (application program interfaces). Implementations of the invention also control the way a computer device operates, i.e., by dynamically controlling the number and timing of retry attempts of microservice calls (e.g., RESTful API calls) between computer devices (e.g., HTTP servers).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
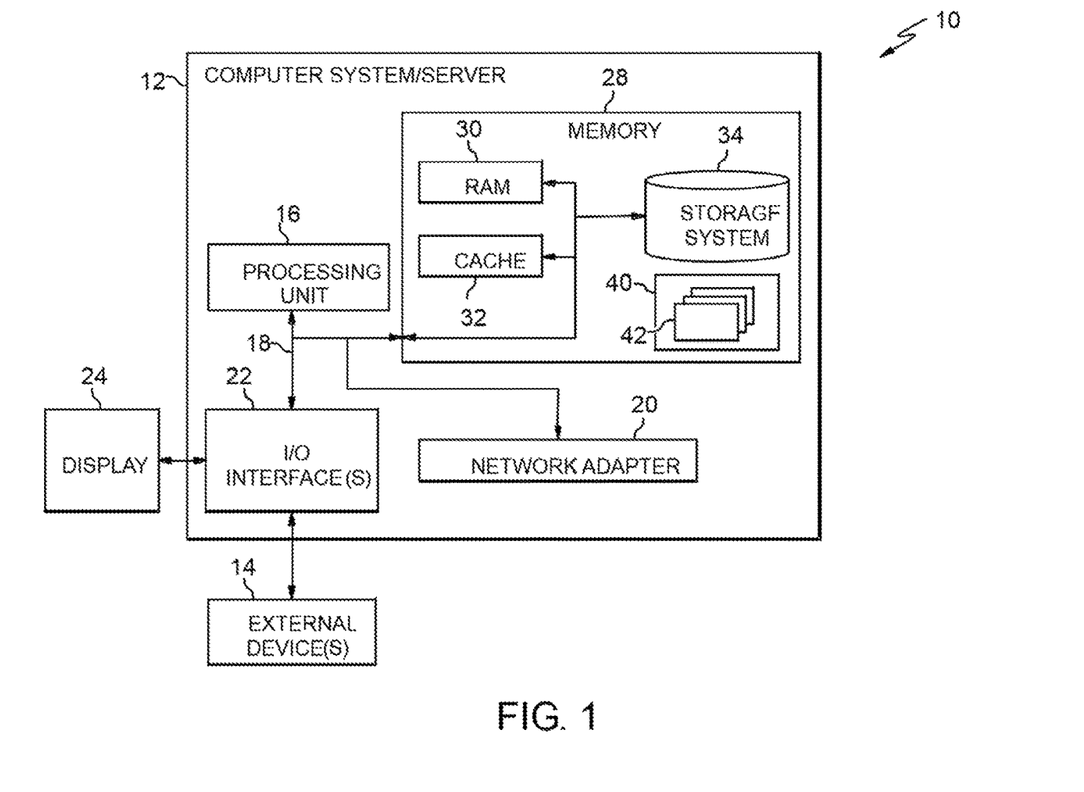
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
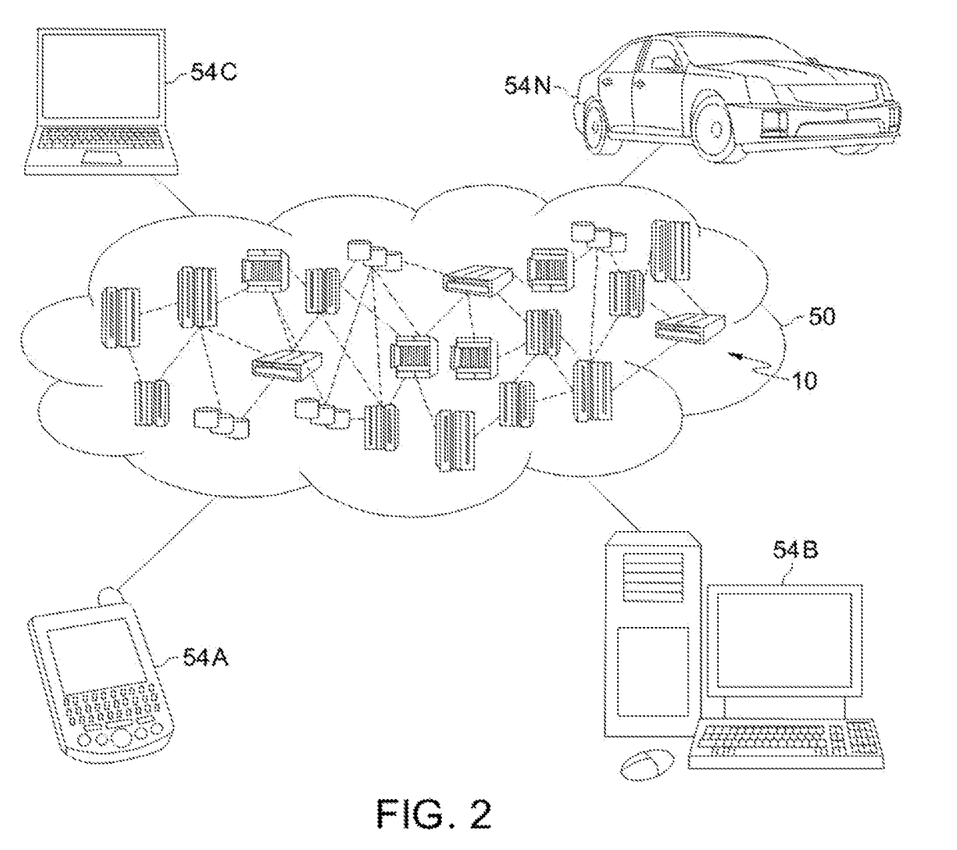
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
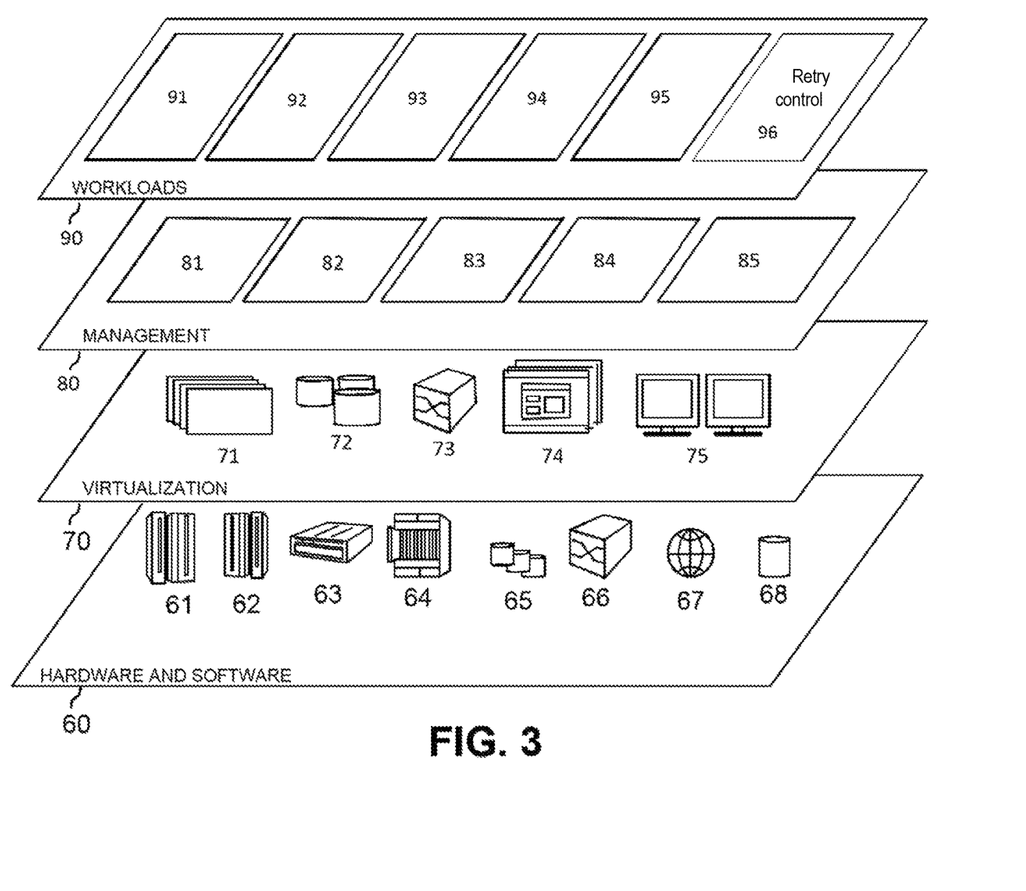
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and retry control 96.

Implementations of the invention include a computer system/server 12 of FIG. 1 in which one or more of the program modules 42 are configured to perform (or cause the computer system/server 12 to perform) one of more functions of the retry control 96 of FIG. 3. For example, in an embodiment, the one or more of the program modules 42 are configured to: receive a microservice call from a calling service, the microservice call including metadata defining a response time; and adjust operational characteristics of a circuit breaker based on the metadata.

Figure 4:
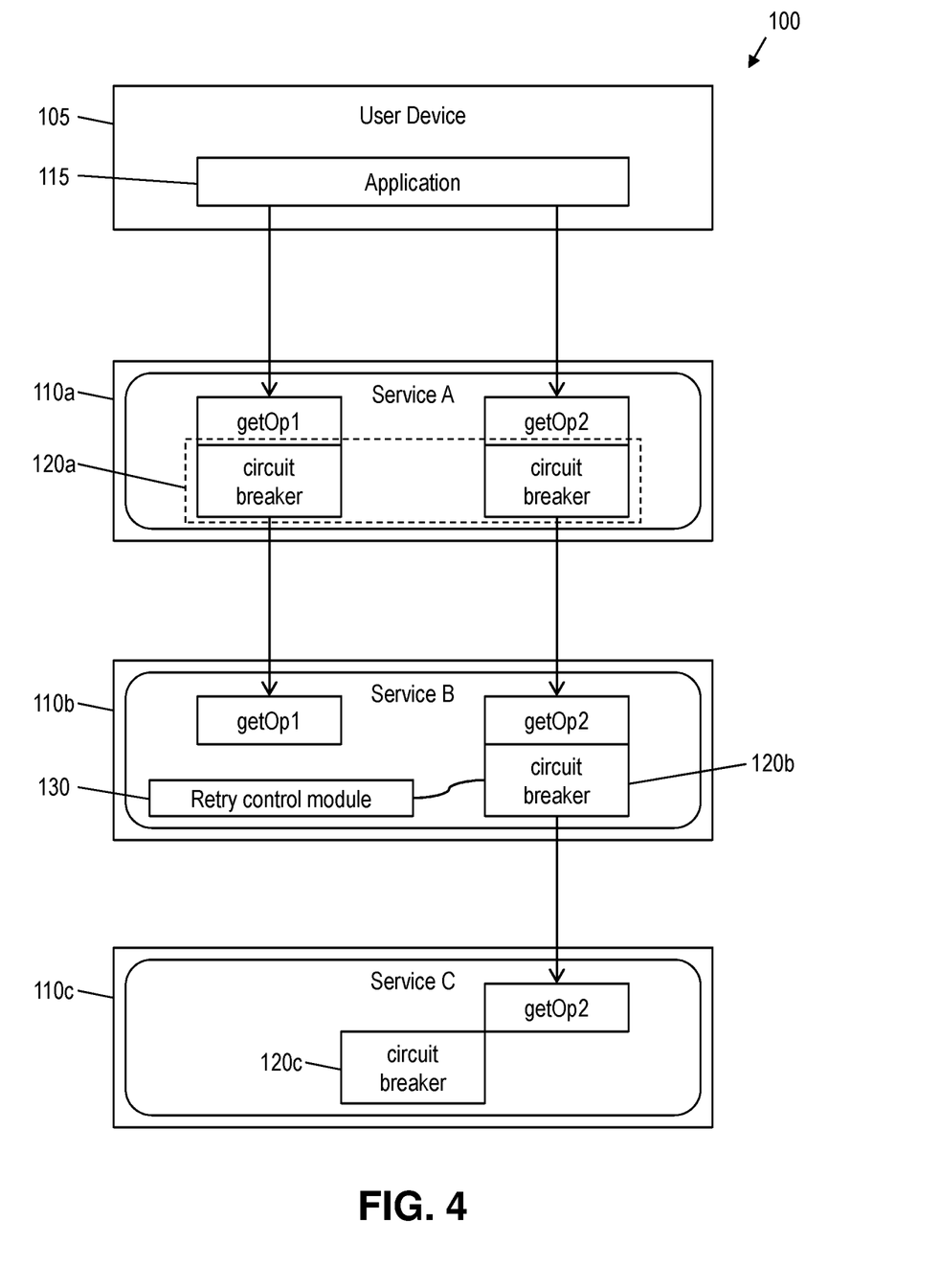
FIG. 4 shows a block diagram of an exemplary environment in accordance with aspects of the invention.

FIG. 4 shows a block diagram of a microservices architecture 100 in accordance with aspects of the invention. In embodiments, the microservices architecture 100 includes a user device 105, a first server 110a, a second server 110b, and a third server 110c. In embodiments, the user device 105 and the servers 110a-c are computer devices that each include one or more components of the computer system/server 12 (described with respect to FIG. 1) and that communicate with one another via a network (e.g., a LAN, a WAN, and the Internet). In a particular embodiment, the user device 105 is one of computing devices 54A-N and the servers 110a-c are cloud computing nodes 10 in the cloud computing environment 50 (described with respect to FIG. 2).

In accordance with aspects of the invention, the user device 105 comprises an application 115, and each of the servers 110a-c comprises at least one microservice (referred to herein as microservice or service) that is configured to perform one or more services (e.g., operations, functions, etc.) for the application 115 within a microservices architecture. In the example shown in FIG. 4, server 110a includes Service A, server 110b includes Service B, and server 110c includes Service C. In embodiments, each service (e.g., Service A, Service B, Service C) comprises a software application that is run on its respective host server. In a particular exemplary embodiment, each of the servers 110a-c is an HTTP server, and the services (e.g., Service A, Service B, Service C) interact with one another over the HTTP protocol using RESTful APIs (application program interfaces). Aspects of the invention are not limited to using HTTP servers, and other protocols are usable.

In embodiments, each server 110a-c includes a respective circuit breaker 120a-c, which is a program module that is configured to control how one service retries service calls (e.g., a GET request) to another service. In aspects, each circuit breaker 120a-c is provided with logic that controls at least one of: a number of retry attempts, a time for each retry attempt, and a total time for all retry attempts. In one embodiment, each circuit breaker 120a-c is included as part of the service application (e.g., Service A, Service B, etc.). In another embodiment, each circuit breaker 120a-c is separate from the service application but resides on the same server as the service application. In yet another embodiment each circuit breaker 120a-c resides on a different computer device (e.g., other than the server that hosts the service application).

It is noted that FIG. 4 shows an exemplary microservices solution for the application 115 to illustrate aspects of the invention. Implementations of the invention are not limited to this particular exemplary microservices solution, and other configurations of microservices solutions are usable in embodiments. In the exemplary microservices solution shown, Service B exposes two operations "getOp1" (associated with Operation 1) and "getOp2" (associated with Operation 2). The getOp1 operation is serviced by Service B, and the getOp2 operation involves Service B sending a request to Service C over HTTP transport prior to responding to the service consumer. In this example, Service A is the service consumer of Service B, and all the microservices employ a circuit breaker design pattern where by default the circuit breaker 120a-c attempts a GET request five (5) times at increasing intervals (of 1 second, 2 seconds, 4 seconds, 8 seconds, and 16 seconds) before marking the target service as unavailable for a period of time.

A first exemplary use case is described with respect to FIG. 4 to illustrate conventional operation. In the first use case, Service A receives input from the application 115 and determines that the input requires performing Operation 2. Service A calls getOp2 on Service B, and the circuit breaker 120a of Service A sets a 5 second timeout on this call, i.e., meaning that Service A will wait for 5 seconds for a response from Service B for the getOp2 request. On the one hand, if Service A receives an answer to the call within the 5 seconds, then Service A returns the result of the call to the application 115 and the application 115 continues to function normally. On the other hand, if Service A does not receive an answer to the call within the 5 seconds, then Service A returns an error message to the application 115.

To illustrate the latter scenario of the first exemplary use case, consider the example where Service B receives the getOp2 request from Service A, processes the request, and calls Service C with a getOp2 request. In response to receiving the getOp2 request from Service B, Service C responds with an error message (e.g., an HTTP 503 Service Unavailable message). Service B follows the retry logic defined in the circuit breaker 120b by retrying the getOp2 request to Service C three more times with the defined incremental backoff intervals (e.g., at 2 seconds, 4 seconds, 8 seconds), and Service C responds to each retry with the same error message. As a result of this scenario, Service B has spent 15 seconds (i.e., 1 second+2 seconds+4 seconds+8 seconds) making the getOp2 request to Service C. The circuit breaker 120a of Service A, however, timed out at 5 seconds and closed the socket on which the request was sent from Service A to Service B. As a result, even if Service B re-tries the getOp2 request to Service C another time and successfully receives a response from Service C on this fifth try, Service B cannot deliver the response payload to Service A because circuit breaker 120a of Service A has already timed out for this particular request. This scenario results is wasted resources (e.g., time and processing resources) because Service B continues using computing resources (i.e., retrying the getOp2 request to Service C) after Service A has already timed out (i.e., at 5 seconds).

Aspects of the invention address this shortcoming by effectively making the downstream service aware of the response time indicated by the upstream service, and by controlling the retry operation of the downstream service based on this indicated response time. In embodiments, the upstream service includes metadata in the call to the downstream service, wherein the metadata defines the response time. In a particular exemplary embodiment, the metadata is included in a header field of the call to the downstream service.

A second exemplary use case is described with respect to FIG. 4 to illustrate operation in accordance with aspects of the invention. In the second use case, Service A receives input from the application 115 and determines that the input requires performing Operation 2. Service A calls getOp2 on Service B, and the circuit breaker 120a of Service A sets a 5 second timeout on this call meaning that Service A will wait for 5 seconds for a response from Service B for the getOp2 request. According to aspects of the invention, Service A includes metadata in the getOp2 request that it sends to Service B, where the metadata defines a response time of 5 seconds (i.e., equal to the timeout time set by the circuit breaker 120a of SA). In a particular exemplary embodiment, Service A includes the indicated response time of 5 seconds in a header field of the getOp2 request that it sends to Service B.

Still referring to the second exemplary use case, Service B receives the getOp2 request from Service A, processes the request, and determines to call Service C with a getOp2 request. In accordance with aspects of the invention, Service B modifies the retry logic of circuit breaker 120b based on the metadata received from Service A. In embodiments, Service B modifies the retry logic of circuit breaker 120b such that Service B can perform all of its retry attempts (e.g., five in this example) in the indicated response time defined by the metadata received from Service A (e.g., 5 seconds in this example). For example, in the second exemplary use case, Service B changes its retry time intervals from 1, 2, 4, 8, and 16 seconds (i.e., as initially defined by the circuit breaker 120b) to modified values of 150 milliseconds (ms), 300 ms, 600 ms, 1.2 seconds, and 2.4 seconds, respectively. In this manner, Service B may perform all five of its retry attempts (if necessary) within a sum total of 4.65 seconds, which means that Service B can respond to Service A within the 5 seconds indicated response time defined by the metadata received from Service A. In this manner, Service B returns a response to Service A (either a successful response payload obtained from Service C or an error message) while the socket at Service A is still open. As a result, implementations of the invention advantageously avoid the situation where Service B expends computing resources retrying attempts for a service call after Service A has already timed out.

In embodiments, a retry control module 130 is configured to modify the retry logic in the manner described herein. In implementations, the retry control module 130 is one or more program modules (e.g., program modules 42 of FIG. 1) that communicate with the circuit breaker 120b to control the retry logic of the circuit breaker 120b. In one embodiment, the retry control module 130 is part of Service B. In another embodiment, the retry control module 130 is running on the server 110b but is separate from Service B.

In one embodiment, the retry control module 130 controls the retry logic based only on the metadata received from the upstream service. In this embodiment, as described in the second exemplary use case, the retry control module 130 is configured to control the retry logic of circuit breaker 120b to cause the total number of possible retries to fit within the time indicated by Service A, i.e., to change the retry time intervals from 1, 2, 4, 8, and 16 seconds to 150 milliseconds (ms), 300 ms, 600 ms, 1.2 seconds, and 2.4 seconds, respectively. The particular numeric values of these intervals are merely exemplary, and other numeric values are usable in implementations of the invention so long as the sum total of the numeric values is less than the response time defined in the metadata by the upstream service.

In another embodiment, the retry control module 130 controls the retry logic based on a combination of: (i) metadata received from the upstream service and (ii) historical data about the downstream service and another downstream service. In embodiments, the historical data includes at least one of: processing time; network latency; and likelihood of failure.

Processing time, in embodiments, includes the amount of time spent by a service processing a request. Using the example illustrated in FIG. 4, processing time is an amount of processing time spent by Service B prior to sending the getOp2 request to Service C and after receiving a response to the getOp2 request that was sent to Service C. In accordance with aspects of the invention, the retry control module 130 tracks the amount of processing time that Service B utilizes each time that Service B makes the getOp2 request to Service C, determines an average processing time based on the tracked (i.e., historical) values, and uses the average processing time as a factor in modifying the retry logic for when Service B sends a getOp2 request to Service C. For example, the retry control module 130 may determine that the average processing time is 100 ms when Service B sends a getOp2 request to Service C. In this example, based on this determined average processing time, the retry control module 130 changes Service B's retry time intervals from 1, 2, 4, 8, and 16 seconds to 150 milliseconds (ms), 300 ms, 600 ms, 1.1 seconds, and 2.2 seconds, respectively. As a result, the total time for Service B to perform all tries of the call is 4.85 seconds (i.e., 4.35 seconds for the combined time of the intervals plus 500 milliseconds for the combined processing time), which is less than the 5 seconds indicated by Service A. In another embodiment, the retry control module 130 reduces the number of retries (e.g., from 5 to 4) based on the historical processing time such that the total time (e.g., intervals plus processing time) is less than the response time indicated by Service A. In this manner, the retry control module 130 controls the retry logic based on a combination of the metadata received from the upstream service and historical processing time of the service with which the retry control module 130 is associated.

Network latency, in embodiments, includes the amount of time between when a request is made and when a response to the request is received. Using the example illustrated in FIG. 4, network latency is an amount of time that Service B waits from a response from Service C after Service B sends the getOp2 request to Service C. The response in this case can be either a response payload or an error message. In accordance with aspects of the invention, the retry control module 130 tracks the network latency each time that Service B makes the getOp2 request to Service C, determines an average network latency based on the tracked (i.e., historical) values, and uses the average network latency as a factor in modifying the retry logic for when Service B sends a getOp2 request to Service C. In this manner, the retry control module 130 controls the retry logic (e.g., reduces one or more interval times and/or reduces the number of retries) based on a combination of the metadata received from the upstream service and the historical network latency.

Likelihood of failure, in embodiments, includes a number of retry attempts before the called service returns a valid response (e.g., a response payload) instead of an error message. Using the example illustrated in FIG. 4, likelihood of failure is the number of times that Service B retries the getOp2 request to Service C before Service C returns a valid response to Service B. In accordance with aspects of the invention, the retry control module 130 tracks the likelihood of failure each time that Service B invokes a getOp2 request to Service C, determines an average likelihood of failure based on the tracked (i.e., historical) values, and uses the average likelihood of failure as a factor in modifying the retry logic for when Service B sends a getOp2 request to Service C. In this manner, the retry control module 130 controls the retry logic (e.g., reduces one or more interval times and/or reduces the number of retries) based on a combination of the metadata received from the upstream service and the historical likelihood of failure.

Figure 5:
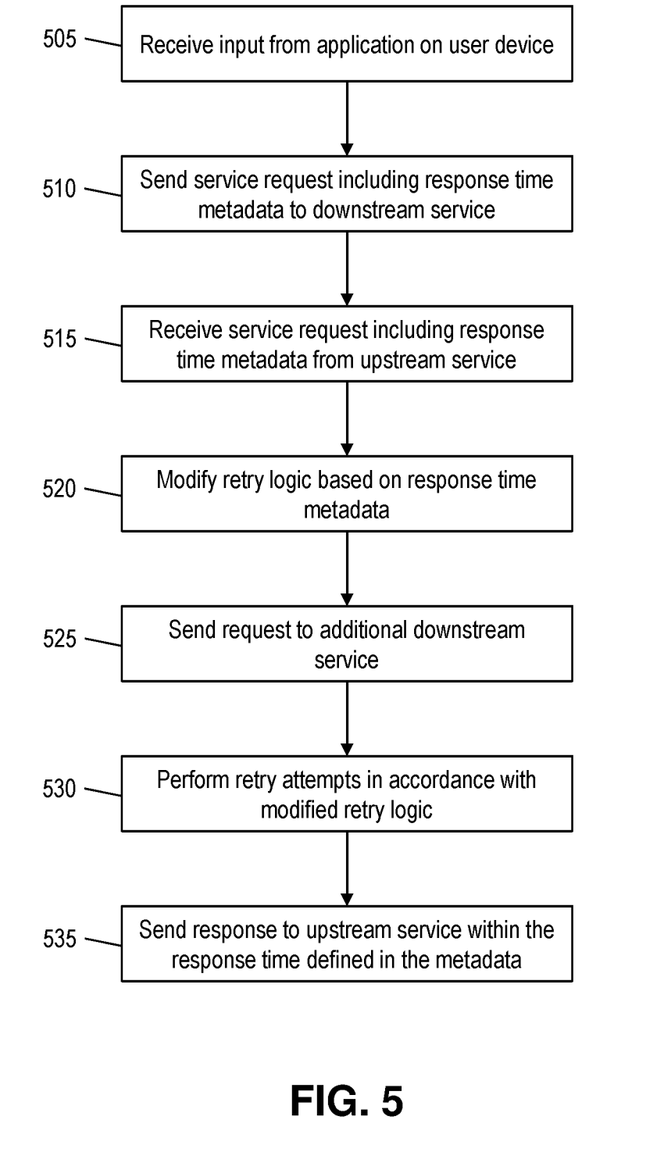
FIG. 5 shows a flowchart of an exemplary method in accordance with aspects of the invention.

FIG. 5 shows a flowchart of an exemplary method in accordance with aspects of the present invention. In embodiments, steps of the method are carried out in the environment of FIG. 4 and are described with reference to elements depicted in FIG. 4.

At step 505, the system receives input from an application on a user device. In embodiments, and as described with respect to FIG. 4, Service A receives input from the application 115 that is running on the user device 105.

At step 510, in response to the input received at step 505, an upstream service sends a service request including response time metadata to downstream service. For example, as described with respect to FIG. 4, Service A sends a getOp2 request to Service B (i.e., Service A calls getOp2 on SB). In embodiments, Service A includes metadata in the request that defines a response time (e.g., 5 seconds in the example described with respect to FIG. 4).

At step 515, the downstream service receives the service request of step 510 including the response time metadata. For example, as described with respect to FIG. 4, Service B receives the getOp2 request from Service A.

At step 520, the downstream service modifies its retry logic based on the response time metadata received in the request at step 515. In embodiments, and as described with respect to FIG. 4, a retry control module 130 modifies the retry logic of the downstream service by reducing one or more interval times or retry attempts and/or reducing a number of retry attempts, such that the total time spent by the downstream service calling another downstream service is less than the response time metadata received in the request at step 515. In one embodiment, the retry control module 130 modifies the retry logic of the downstream service based on only the metadata. In another embodiment, the retry control module 130 modifies the retry logic of the downstream service based on a combination of the metadata and historical data. In embodiments, the historical data includes at least one of: processing time; network latency; and likelihood of failure.

At step 525, the downstream service sends a request to an additional downstream service. For example, as described with respect to FIG. 4, Service B sends the getOp2 request to Service C.

At step 530, the downstream service performs retry attempts in accordance with the modified retry logic as determined at step 520. For example, as described with respect to FIG. 4, Service B receives an error message from Service C and retries the getOp2 request to Service C in accordance with the retry time intervals and number of retries dictated by the modified retry logic.

At step 535, the downstream service sends a response to upstream service within the response time defined in the metadata from step 510. For example, as described with respect to FIG. 4, Service B sends either a valid response (e.g., a response payload) or an error message to Service A in the response time indicated by Service A (e.g., 5 seconds in this example).

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving, by a computer device, a request from an upstream service in a microservices architecture, wherein the computer device runs a downstream service in the microservices architecture and wherein metadata is in the request;
   modifying, by the computer device, retry logic of the downstream service comprises reducing the number of retry attempts and reducing at least one of the time intervals between retry attempts;
   sending, by the computer device, a request to an additional downstream service;
   performing, by the computer device, retry attempts of the request to the additional downstream service in accordance with the modified retry logic; and
   sending, by the computer device, a response to the upstream service within a response time defined by the metadata.

2. The method of claim 1, wherein the downstream service is associated with a circuit breaker that defines the number of retry attempts and the time intervals between retry attempts.

3. The method of claim 2, wherein the modifying is based only on the metadata.

4. The method of claim 2, wherein the modifying is based on a combination of the metadata and historical data.

5. The method of claim 4, wherein the historical data comprises at least one selected from the group consisting of: processing time; network latency; and likelihood of failure.

6. The method of claim 2, wherein the modifying comprises:
   determining that a sum total of the time intervals defined by the circuit breaker exceeds the response time defined by the metadata; and
   changing a value of each of the time intervals such that a sum total of the time intervals, after the changing, is less than the response time defined by the metadata.

7. The method of claim 1, wherein a service provider at least one of creates, maintains, deploys and supports the computer device.

8. The method of claim 1, wherein the response sent to the upstream service is one of a valid response and an error message.

9. The method of claim 1, wherein:
   the upstream service is running on a first HTTP server;
   the computer device is a second HTTP server; and
   the additional downstream service is running on a third HTTP server; and
   the upstream service, the downstream service, and the additional downstream service communicate via HTTP protocol.

10. The method of claim 9, wherein the upstream service, the downstream service, and the additional downstream service communicate via application program interface (API).

11. The method of claim 9, wherein the upstream service, the downstream service, and the additional downstream service communicate via RESTful application program interface (API).

12. The method of claim 1, wherein the computer device includes software provided as a service in a cloud environment.

13. A computer program product, the computer program product comprising a computer readable storage medium having program instructions embodied therewith, the program instructions executable by a computer device to cause the computer device to:
   receive a request from an upstream service in a microservices architecture, wherein the computer device runs a downstream service in the microservices architecture and wherein metadata is in the request;
   modify retry logic defined by a circuit breaker of the downstream service;
   send a first request to an additional downstream service;
   perform retry attempts of the request to the additional downstream service in accordance with the modified retry logic; and
   send a response to the upstream service within a response time defined by the metadata,
   wherein the modifying is performed before the sending of the first request to the additional downstream service,
   the modifying the retry logic comprises reducing the number of retry attempts and reducing at least one of the time intervals between retry attempts, and
   the response time is greater than zero.

14. The computer program product of claim 13, wherein:
   the circuit breaker defines a number of retry attempts and time intervals between retry attempts; and
   the modifying the retry logic comprises at least one from the group consisting of: reducing the number of retry attempts; and reducing at least one of the time intervals between retry attempts.

15. The computer program product of claim 14, wherein the modifying is based only on the metadata.

16. The computer program product of claim 15, wherein the historical data comprises at least one selected from the group consisting of: processing time; network latency; and likelihood of failure.

17. The computer program product of claim 14, wherein the modifying is based on a combination of the metadata and historical data.

18. A system comprising:
   a computer device running a downstream service in a microservices architecture, the computer device comprising a processor, a computer readable memory, and a computer readable storage medium;

program instructions to receive a request from an upstream service in a microservices architecture, wherein response time metadata is in the request;

program instructions to modify retry logic defined by a circuit breaker of the downstream service, the modifying being based on the metadata;

program instructions to send a first request to an additional downstream service;

program instructions to perform retry attempts of the request to the additional downstream service in accordance with the modified retry logic; and program instructions to send a response to the upstream service within a response time defined by the metadata, wherein the response sent to the upstream service is one of a valid response and an error message, wherein the modifying is performed before the sending of the first request to the additional downstream service, the response time is greater than zero, the metadata is included in a header field of the request from the upstream service, and wherein the program instructions are stored on the computer readable storage medium for execution by the processor via the computer readable memory.

\* \* \* \* \*